(12) United States Patent
Lee et al.

(10) Patent No.: US 6,690,227 B2
(45) Date of Patent: Feb. 10, 2004

(54) CHARGE PUMP CIRCUIT FOR USE IN HIGH VOLTAGE GENERATING CIRCUIT

(75) Inventors: Byeong-Hoon Lee, Seoul (KR); Seung-Keun Lee, Kyunggi-do (KR); Seung-Won Lee, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/055,269

(22) Filed: Jan. 22, 2002

(65) Prior Publication Data

US 2003/0006825 A1 Jan. 9, 2003

(30) Foreign Application Priority Data

Jul. 7, 2001 (KR) ......................................... 2001-40693

(51) Int. Cl.[7] ............................. G05F 1/10; G05F 3/02
(52) U.S. Cl. ..................................................... 327/536
(58) Field of Search ................................. 327/536, 537, 327/589; 363/59, 60

(56) References Cited

U.S. PATENT DOCUMENTS 4,922,402 A * 5/1990 Olivo et al. ................... 363/60
6,023,188 A * 2/2000 Lee et al. ..................... 327/536

* cited by examiner

*Primary Examiner*—Terry D. Cunningham
*Assistant Examiner*—Quan Tra
(74) *Attorney, Agent, or Firm*—Marger Johnson & McCollom, P.C.

(57) ABSTRACT

A charge pump circuit includes a plurality of serially connected pump stages. Each pump stage includes current paths connected between a gate terminal of a charge transfer transistor and a drain terminal thereof. One of the charge transfer paths allows charges to be transferred from the drain terminal to the gate terminal while the other path allows charges to be transferred from the gate terminal to the drain terminal. The charge pump circuit can generate a high target voltage using a very low power supply voltage (e.g., 2V or lower).

23 Claims, 10 Drawing Sheets

140

CHARGE PUMP CIRCUIT FOR USE IN HIGH VOLTAGE GENERATING CIRCUIT

This application relies for priority upon Korean Patent Application No. 2001-40693, filed on Jul. 7, 2001, the contents of which are herein incorporated by reference in their entirety.

BACKGROUND OF THE INVENTION

1. Field of the Invention

The present invention is related to integrated circuit devices. More particularly, the presents invention relates to a voltage generating circuit for generating a voltage higher than a power supply voltage.

2. Related Art

Recently, there have been many attempts to reduce the power supply voltage of integrated circuit devices. In particular, flash electrically erasable and programmable read only memory ("flash EEPROM") devices have been designed to operate at a very low voltage level (e.g., 2V or lower).

Unfortunately, since erasing or programming the flash EEPROM requires a high voltage (e.g., 10V or higher), a method of generating the high voltage using the low power supply voltage is required. A charge pump circuit is typically used to generate the required high voltage level. Conventional charge pump circuits are able to generate the required high voltage using a power supply voltage of around 3.3–5V. If the power supply voltage is lower than that, however, the pump performance of the charge pump circuit is generally reduced. In the worst case, this may result in the required high voltage not being produced.

SUMMARY OF THE INVENTION

An object of the present invention is to provide a charge pump circuit that is capable of producing high pump efficiency at a very low power supply voltage.

Another object of the present invention is to enable a charge pump circuit to generate a high target voltage over a long period of time without sharp reductions in capacity.

In order to attain the above objects, a charge pump circuit includes an input terminal that receives an input voltage and an output terminal that outputs an output voltage. A pre-charge transistor is connected between a power supply voltage terminal and the input terminal and is turned on and off based on a control signal. A plurality of pump stages are connected in series between the input and output terminals.

Complementary first and second clock signals are also provided. Odd-numbered ones of the pump stages are operated in response to either the first or the second clock signal. Even-numbered ones of the pump stages are operated in response to the other one of the clock signals.

In each pump stage of one embodiment, a charge transfer transistor has a gate terminal, a first terminal, a second terminal, and a bulk terminal. The bulk terminal is floated. A first capacitor is connected between the gate terminal of the charge transfer transistor and one of the first and second clock signals. A second capacitor is connected between the second terminal of the charge transfer transistor and the same clock signal as the first capacitor.

A first control transistor can be provided to control a current flow from the second terminal of the charge transfer transistor to the gate terminal thereof. The first control transistor has a gate and a first terminal connected in common to the gate terminal of the charge transfer transistor, a second terminal connected to the second terminal of the charge transfer transistor, and a bulk terminal that is floated.

A second control transistor can be provided to control a current flow from the gate terminal of the charge transfer transistor to the second terminal thereof. The second control transistor has a gate and a first terminal connected in common to the second terminal of the charge transfer transistor, a second terminal connected to the gate terminal of the charge transfer transistor, and a bulk terminal that is floated. Many other aspects and embodiments are also provided, however, as described in further detail below.

BRIEF DESCRIPTION OF THE DRAWINGS

A better understanding and appreciation of the present invention will be obtained through the following detailed description of embodiments thereof, made with reference to the accompanying drawings, in which like reference numerals denote like or corresponding parts, and wherein.

DETAILED DESCRIPTION OF PREFERRED EMBODIMENTS

Figure 1:
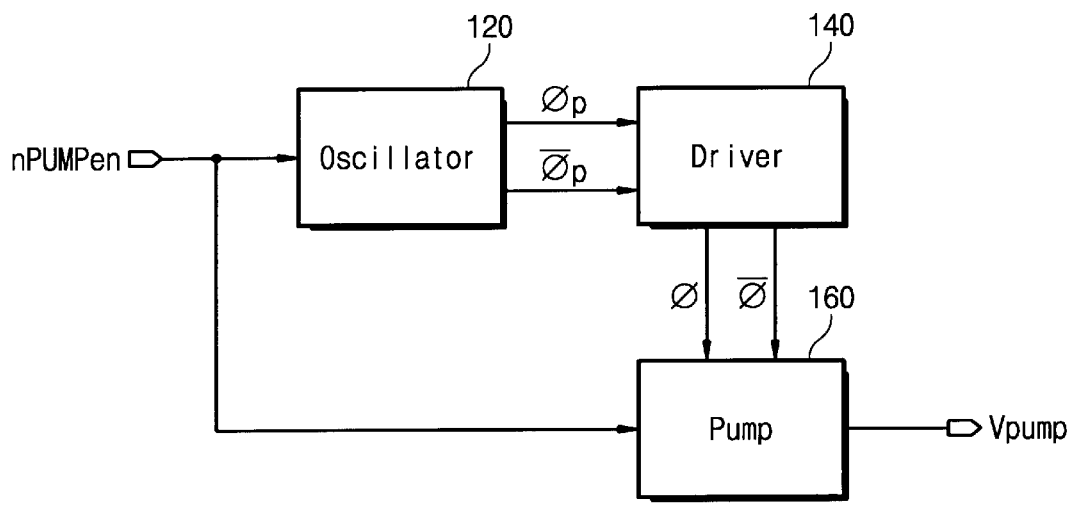
FIG. 1 is a block diagram showing a high voltage generating circuit according to an aspect of the present invention.

Referring to FIG. 1, according to one aspect of the present invention, a high voltage generating circuit includes an oscillator block 120, a driver block 140, and a charge pump circuit 160. The oscillator block 120 outputs complementary first and second oscillation signals fP, /fP during an oscillation operation, in response to an active-low pump enable signal nPUMPen.

Figure 2:
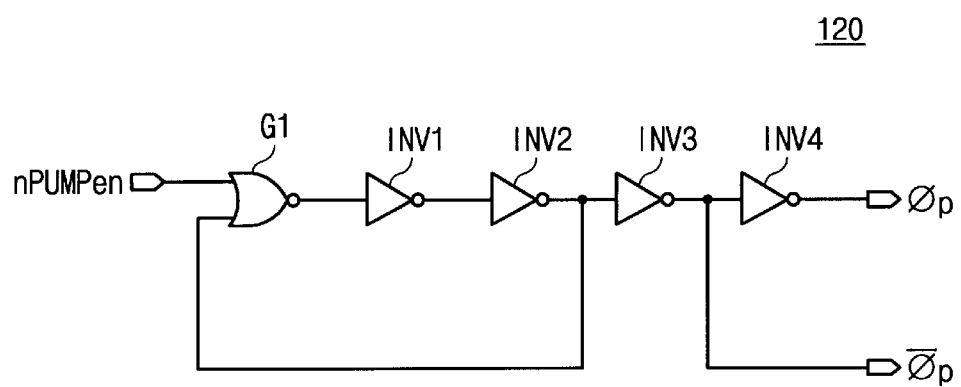
FIG. 2 is a schematic circuit diagram of a preferred embodiment of an oscillator block of the high voltage generating circuit of FIG. 1.

FIG. 2 is a schematic circuit diagram showing an embodiment of the oscillator block 120 in further detail. Referring to FIG. 2, the oscillator block 120 preferably has a NOR gate G1 and four inverters INV1 to INV4 connected as illustrated.

Figure 3:
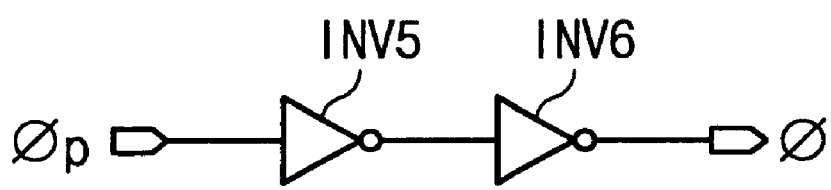
FIG. 3 is a schematic circuit diagram of a preferred embodiment of a driver block of the high voltage generating circuit of FIG. 1.
Figure 3:
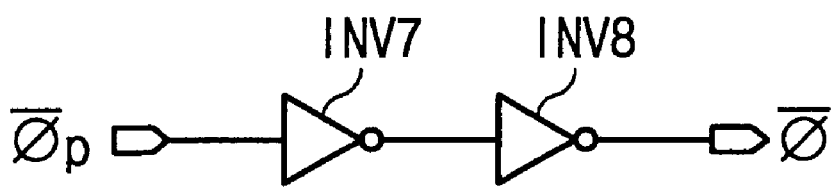

Referring again to FIG. 1, the driver block 140 receives the oscillation signals fP, /fP from the oscillator block 120 and outputs complementary first and second clock signals f, /f. The driver block 140 includes four inverters INV5 to INV8, which are connected as illustrated in FIG. 3.

Figure 4:
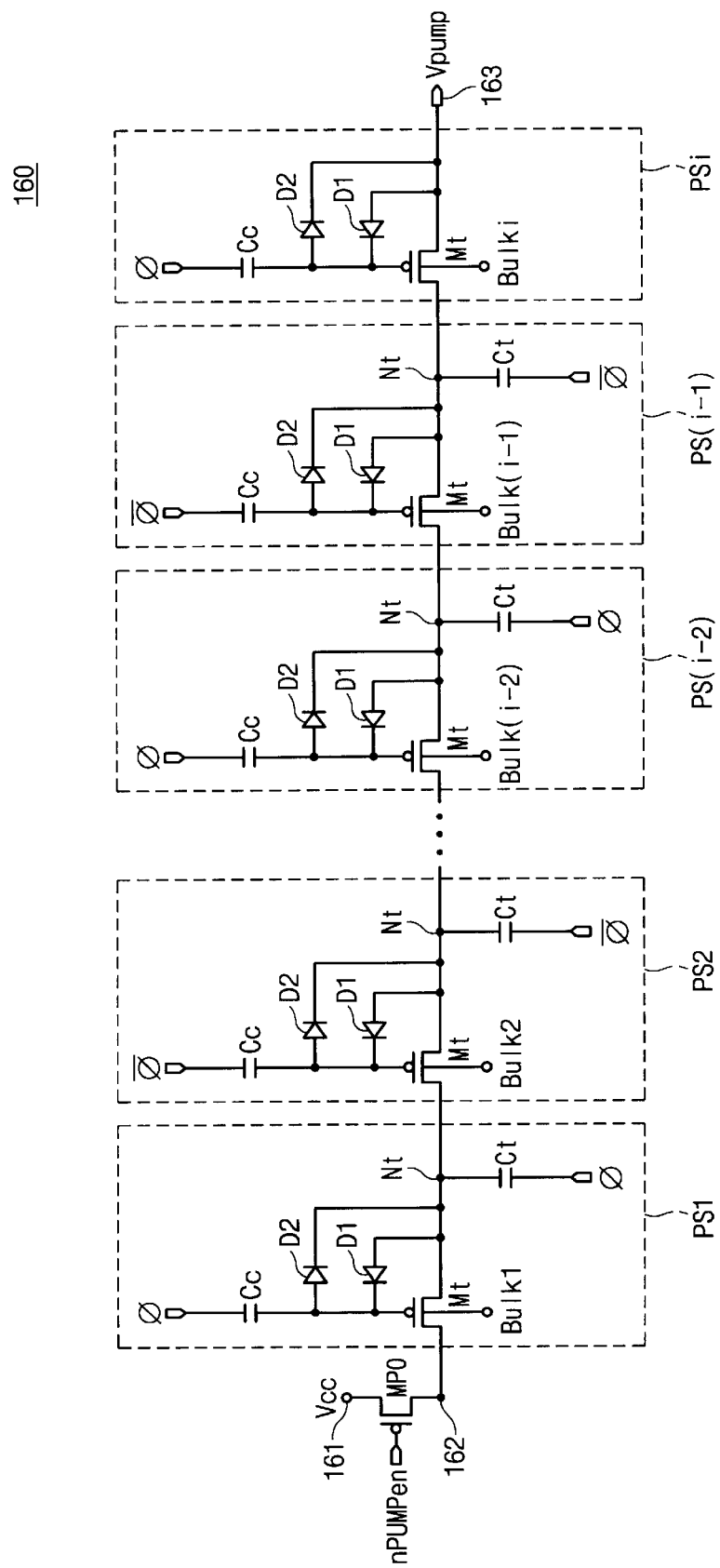
FIG. 4 is a schematic circuit diagram of a first embodiment of a charge pump circuit of the high voltage generating circuit of FIG. 1.

Referring to FIG. 4, in one embodiment, a charge pump circuit 160 of the high voltage generating circuit of FIG. 1 includes a first PMOS transistor MP0 and a plurality of pump stages PS1–PSi. The first PMOS transistor MP0 is connected between a power supply voltage terminal 161 and a precharge node 162 to operate as a precharge transistor. The pump stages PS1–PSi are connected serially between the precharge node 162 and an output terminal 163.

The pump enable signal nPUMPen operates as a control signal to control the precharge transistor MP0. Odd-numbered pump stages PS1, PS3, etc. operate responsive to the first clock signal f, while even-numbered pump stages PS2, PS4, etc. operate responsive to the second clock signal /f (or vice versa). Each of the pump stages PS includes two capacitors Ct, Cc, a transfer (or "charge transfer") transistor Mt, and first and second current paths (or charge paths) provided through a first and second diode D1, D2, respectively.

The components of each pump stage PS are denoted by the same reference symbols for convenience. The reference symbol "t" stands for "transfer" and "c" stands for "control". Although the circuit configuration will be described only with respect to a first pump stage PS1, it should be understood that the remaining pump stages PS2–Psi are configured in the same manner as the first pump stage PS1.

With continued reference to FIG. 4, the charge transfer transistor Mt of the first pump stage PS1 is a PMOS transistor having a gate terminal, a drain terminal, a source terminal, and a bulk terminal. The source terminal of the transfer transistor Mt is connected to the precharge node 162, while the drain terminal thereof is connected to a charge transfer node Nt. The gate terminal of the charge transfer transistor Mt is connected to a first terminal of a control capacitor Cc. The other terminal of the control capacitor Cc is arranged to receive the clock signal f.

The first diode D1 forms the first current path. An anode terminal of the first diode D1 is connected to the drain terminal (charge transfer node Nt) of the charge transfer transistor Mt and a cathode terminal thereof is connected to the gate terminal of the transfer transistor Mt. The second diode D2 forms the second current path. An anode terminal of the second diode D2 is connected to the gate terminal of the charge transfer transistor Mt and a cathode terminal thereof is connected to the drain terminal of the transfer transistor Mt. A first terminal of a transfer capacitor Ct is coupled with the drain terminal of the charge transfer transistor Mt. The other terminal thereof is coupled to receive the clock signal f. In each of remaining pump stages PS2–PSi, a source terminal of the charge transfer transistor Mt is connected to the drain terminal of a charge transfer transistor Mt of a preceding pump stage PS1–PS(i−1), respectively. A bulk terminal of the charge transfer transistor Mt in each pump stage PS is maintained in a floating state.

The first diode D1 provides a current path that enables current or charge to flow from the drain terminal (node Nt) of the transfer transistor Mt to the gate terminal thereof. The diode D1 prevents charges from flowing into the source terminal of the transfer transistor Mt or to a previous stage, based on voltage rise of the charge transfer node Nt. Using the diode D1, the gate voltage of this transistor Mt can be increased as appropriate.

The second diode D2 provides a current path that enables current or charge to flow from the gate terminal of the charge transfer transistor Mt to the drain terminal thereof. The second diode D2 allows excessive charges (or surplus charges) that flow into the gate terminal of the transfer transistor Mt to flow into the charge transfer node Nt.

Figure 5:
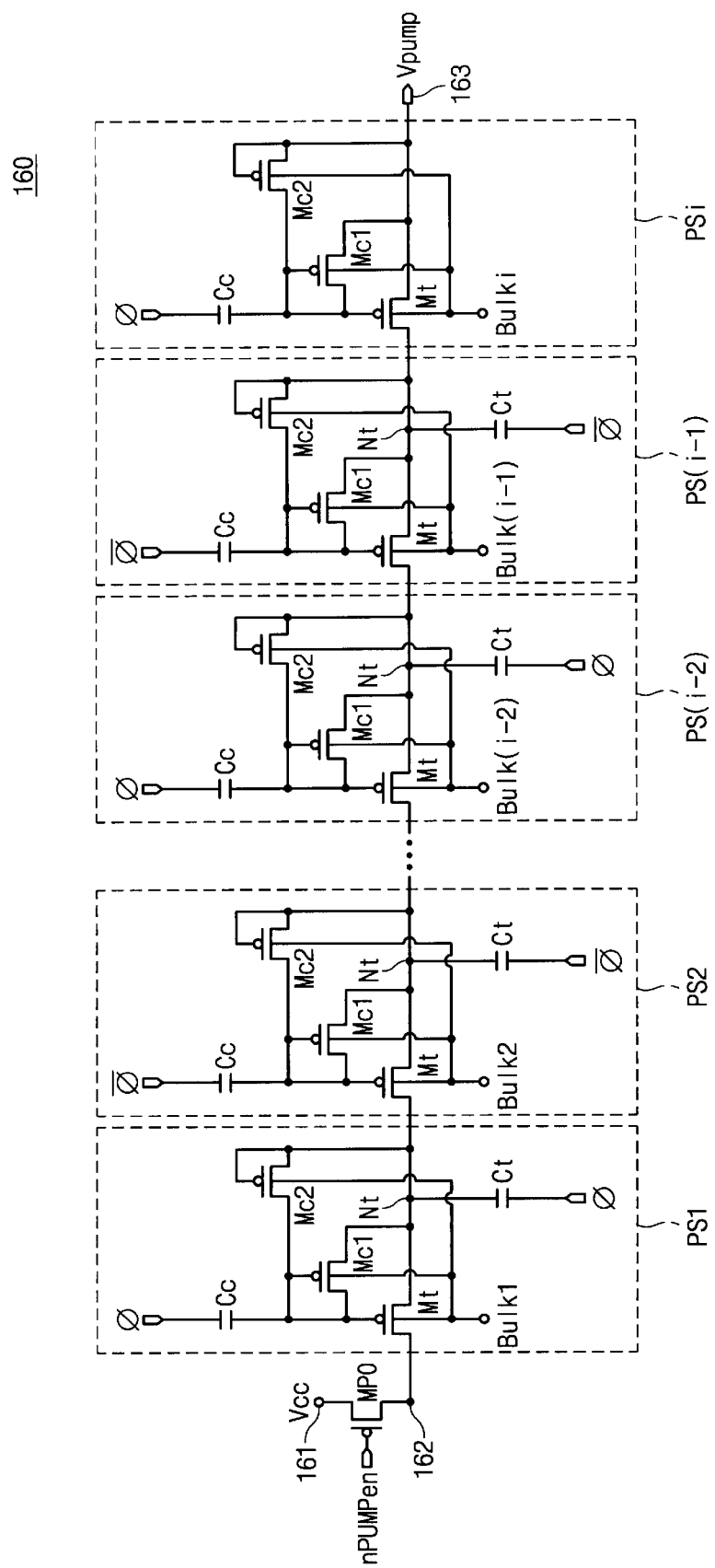
FIG. 5 is a schematic circuit diagram of a charge pump circuit according to another embodiment, similar to that shown in FIG. 4, but formed using PMOS transistors as diodes.

The first and second diodes D1, D2, which respectively form the first and second current paths in each pump stage PS, can be formed by a MOS process. This can be achieved by connecting gate, source, and drain terminals of a MOS transistor so that it will operate as a diode. FIG. 5 illustrates the use of MOS transistors to provide the diodes D1, D2 of the charge pump circuit of FIG. 4.

Referring to FIG. 5, a charge pump circuit of another embodiment is formed using diode-connected PMOS transistors Mc1, Mc2 to replace the diodes D1, D2 of the charge pump circuit of FIG. 4. More specifically, drain and gate terminals of a first control transistor Mc1, which forms the first current path, are connected to the gate terminal of the charge transfer transistor Mt. The source terminal of the first control transistor Mc1 is connected to the charge transfer node Nt.

The source terminal of a second control transistor Mc2, which forms the second current path, is connected to the gate terminal of the charge transfer transistor Mt and its drain and gate terminals are connected commonly to the drain terminal (node Nt) of the charge transfer transistor Mt. The bulk terminals of the control transistors Mc1 and Mc2 are maintained in a floating state.

Operation of the charge pump circuit of FIG. 5 will now be described with continued reference thereto. In operation, if the pump enable signal nPUMPen goes low, the precharge transistor MP0 is turned on, and charges are thereby supplied from the power supply terminal 161 to the precharge node 162. When the first clock signal f becomes low and the second clock signal /f becomes high, the gate voltage of the charge transfer transistor Mt in a first, odd-numbered pump stage PS1 becomes lower than a source voltage of the transistor Mt minus its threshold voltage. Charges flowing into the precharge node 162 are therefore transferred to the charge transfer node Nt through the transfer transistor Mt.

When the first clock signal f becomes high and the second clock signal /f becomes low, the gate voltage of the transfer transistor Mt in a second, even-numbered pump stage PS2 becomes lower than a source voltage Vs of the transistor Mt minus its threshold voltage Vth. The transfer transistor Mt of the second stage PS2 is thereby turned on and charges at the charge transfer node Nt of the first pump stage PS1 are transferred through the transfer transistor Mt of the second pump stage PS2 to the charge transfer node Nt of the second pump stage PS2. At this time, the gate voltage of the charge transfer transistor Mt in the first pump stage PS1 is increased by a coupling voltage of the control capacitor Cc, so that charge or current flow from the charge transfer node Nt of the first pump stage to the precharge node 162 can be blocked.

Operations of the other pump stages PS3–Psi are carried out successively in the same method as described above. In this manner, voltages on the charge transfer nodes Nt of subsequent pump stage PS1–PSi, and the output terminal 163, are gradually increased as charges are transferred from the power supply terminal 161 to the output terminal 163. The foregoing pumping operation can be performed until a required output voltage Vpump is obtained.

When the voltage of the charge transfer node Nt in each pump stage PS is increased, the gate voltage of the transfer transistor Mt of that pump stage PS is also increased. This enables the transfer transistor Mt of each pump stage PS to transfer charges and prevent charge reflux. This can be accomplished as described below.

Assuming that the voltage of the charge transfer node Nt in each pump stage PS becomes higher than the gate voltage Vg of the charge transfer transistor Mt plus the threshold voltage Vth of the first control transistor Mc1, charges on the transfer node Nt in each pump stage PS are transferred into the gate terminal of the transfer transistor Mt, so that the gate voltage of the transfer transistor Mt in each pump stage PS is increased.

When the above-described pumping operation is carried out over a short period of time (e.g., less than a hundred ms), the voltage of the transfer node Nt in each pump stage PS can be stably maintained. A stable voltage is one that provides the voltage level necessary to produce an output voltage Vpump of a required level. When the above-described pumping operation is carried out over a long period of time (e.g., several hundred ms), that is, where the pumping operation continues to be carried out after the charge transfer node Nt has reached the stable voltage level, the gate voltage of the charge transfer transistor Mt in each pump stage PS is increased above the stable voltage level. This is because excessive charges flow from the transfer node Nt into the gate terminal of the transfer transistor Mt through the first current path (formed by the diode D1). This reduces a voltage difference between the gate and source terminals of the transfer transistor Mt in each pump stage PS.

The second control transistor Mc2, which forms the second current path, can suppress the above-described phenomenon that results from the pumping operation being carried out over a long period of time. Specifically, when the first clock signal f is at a high level and the second clock signal /f is at a low level, excessive charges (or surplus charges) flowing into the gate terminal of the charge transfer transistor Mt in each pump stage PS flow out into the charge transfer node Nt from the gate terminal through the second current path. As the above-described operation is repeated, the gate voltage of the transfer transistor Mt in each pump stage PS is maintained appropriately or stably. In other words, even when the pumping operation of the charge pump circuit is performed over a long period of time, the gate terminal of the transfer transistor Mt maintains the stable voltage, so that a stable output voltage Vpump can also be maintained.

Figure 6:
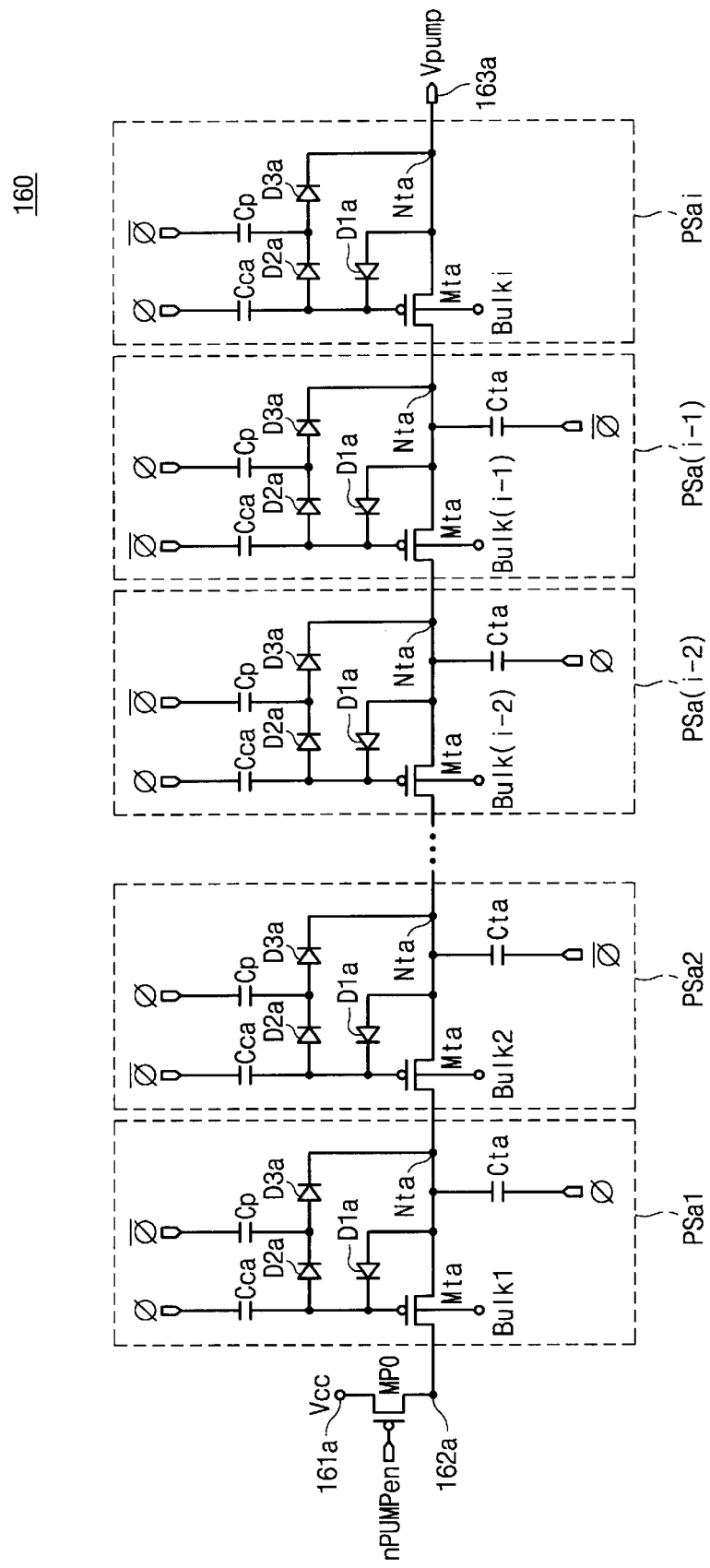
FIG. 6 is a schematic circuit diagram of yet another embodiment of a charge pump circuit of the high voltage generating circuit of FIG. 1.

FIG. 6 is a circuit diagram illustrating a charge pump circuit according to a another embodiment of the present invention. Referring to FIG. 6, the charge pump circuit 160 includes a PMOS transistor MP0, used as a precharge transistor, and a plurality of pump stages PSa1–PSai. The precharge transistor MP0 is connected between a power supply voltage terminal 161a and a precharge node 162a and is turned on and off based on a pump enable signal nPUMPen. The pump stages PSa1–PSai are connected in series between the precharge node 162a and an output terminal 163 for outputting an output voltage Vpump. Each pump stage PSa operates responsive to first and second clock signals f and /f transferred from the driver block 140 in the high voltage generation circuit of FIG. 1. Each pump stage PSa comprises three capacitors Cta, Cca, Cp, one charge transfer transistor Mta, and first and second current paths formed through three diodes D1a, D2a, D3a.

The components of each pump stage PSa are denoted using the same reference symbols. The circuit configuration of only a first pump stage PSa1 will be described for convenience. The other pump stages PSa2–PSai are all similarly configured. The charge transfer transistor Mta has a gate terminal, a drain terminal, a source terminal, and a bulk terminal. Its source terminal is connected to the precharge node 162a, its drain terminal to a charge transfer node Nta, and its gate terminal to a first terminal of the control capacitor Cca.

The other terminal of the control capacitor Cca is coupled to receive the first clock signal f.

A first terminal of the transfer capacitor Cta is connected to the drain terminal (node Nta) of the transfer transistor Mta, and the other terminal thereof is connected to receive the first clock signal f. The charge transfer node Nta is coupled with a source terminal of the transfer transistor Mta in a next pump stage PSa2. The first diode D1a forms the first current path, and the remaining two diodes D2a, D3a and a third capacitor Cp form the second current path.

The first diode D1a has an anode terminal connected to the charge transfer node Nta and a cathode terminal connected to the gate terminal of the charge transfer transistor Mta. In the second current path, an anode terminal of the second diode D2a is coupled with the gate terminal of the transfer transistor Mta and a cathode terminal thereof is coupled with an anode terminal of the third diode D3a. A cathode terminal of the third diode D3a is connected to the drain terminal (node Nta) of the transfer transistor Mta. A first terminal of the third capacitor Cp is connected to a connection node located between the cathode terminal of the second diode D2a and the anode terminal of the third diode D3a. The other terminal of the capacitor Cp is supplied with the second clock signal /f.

As shown in FIG. 6, a source terminal of the charge transfer transistor Mta in respective remaining pump stages PSa2–PSai is coupled to a drain terminal (node Nta) of a charge transfer transistor Mta of a respective previous pump stage Psa1–PSa(i-1). The bulk terminals of the transfer transistors Mta in the pump stages PSa1–PSai are each floated individually.

As described above, the first diode D1a provides a current path that allows current or charges to flow from the drain terminal of the charge transfer transistor Mta to the gate terminal thereof. The first diode D1a is configured to prevent charges from flowing backward into a previous pump stage and increases a gate voltage of the transfer transistor Mta of its pump stage. The second and third diodes D2a, D3a and the third capacitor Cp provide a current path that allows current or charges to flow from the gate terminal of the transfer transistor Mta to its drain terminal. These elements D2a, D3a, Cp are configured to discharge excessive (or surplus) charges from the gate terminal of the transfer transistor Mta into the charge transfer node Nta.

Figure 7:
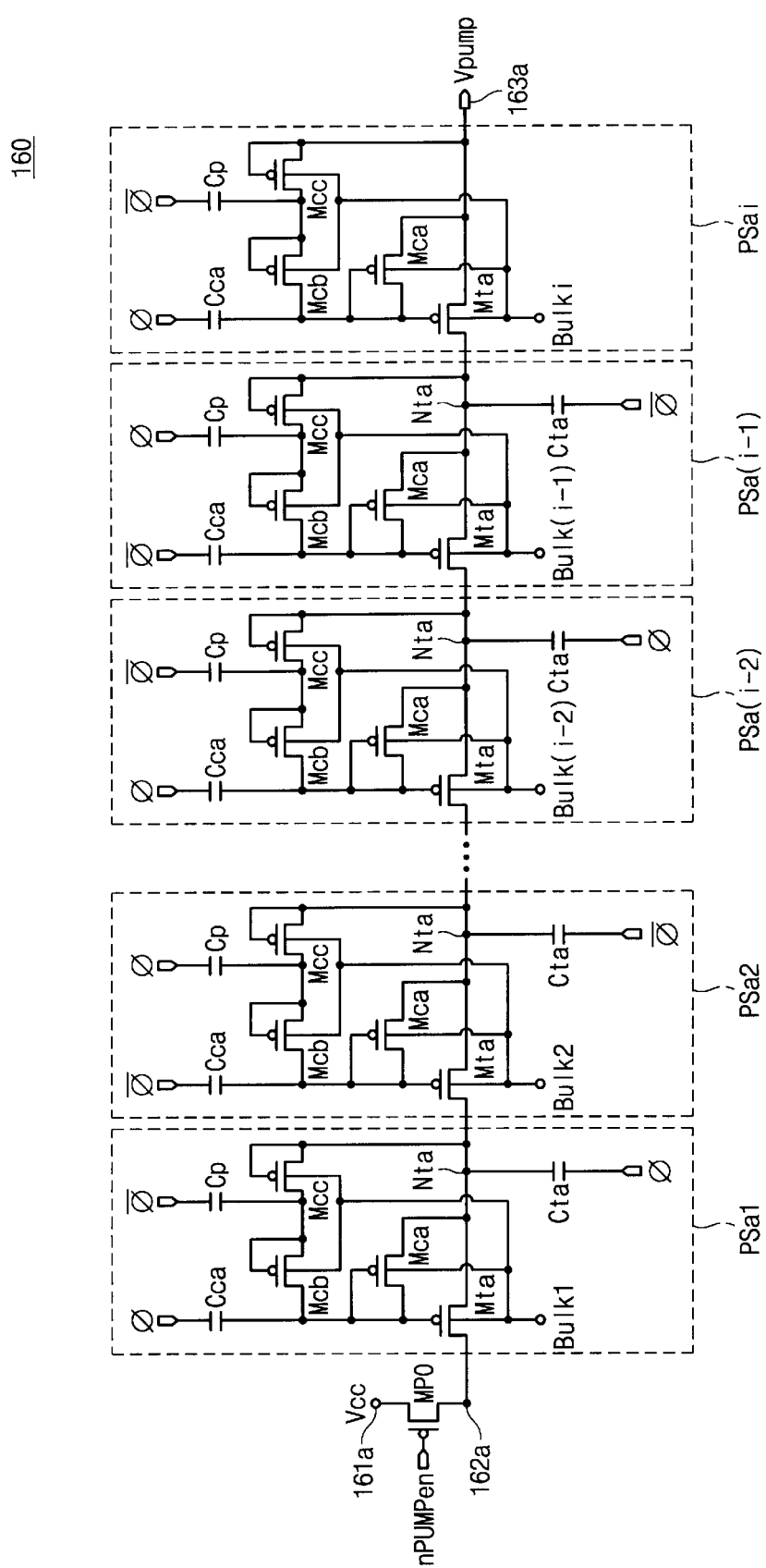
FIGS. 7 and 8 are circuit diagrams of various other embodiments of the charge pump circuit, similar to that of FIG. 6, but formed using PMOS transistors.

The first, second, and third diodes D1a, D2a, D3a in each pump stage PSa can be provided using a pure MOS process. In other words, terminals of a MOS transistor can be configured so that the transistor operates as a diode. A charge pump circuit configured using diode-connected PMOS transistors is illustrated in FIG. 7. In FIG. 7, first, second, and third control transistors Mca, Mcb, Mcc correspond to the first, second, and third diodes D1a, D2a, D3a, respectively, of FIG. 6.

Referring to FIG. 7, drain and gate terminals of the first control transistor Mca are connected commonly with the gate terminal of the transfer transistor Mta. The source terminal of the first control transistor Mca is coupled with the charge transfer node Nta. A source terminal of the second control transistor Mcb is connected to the gate terminal of the transfer transistor Mta and drain and gate terminals thereof are tied commonly to a first terminal of the capacitor Cp. The other terminal of the capacitor Cp is coupled to receive the second clock signal /f. A source terminal of the third control transistor Mcc is coupled with the first terminal of the capacitor Cp and drain and gate terminals of the third control transistor Mcc are connected commonly to the drain terminal (node Nta) of the transfer transistor Mta. Bulk terminals of the control transistors Mca, Mcb, Mcc are floated in the same well (not shown).

Operation of a charge pump circuit constructed according to the foregoing embodiment of the present invention will now be more fully described with reference to FIGS. 6 and 7. If the pump enable signal nPUMPen goes low, the precharge transistor MP0 is turned on, so that charges are supplied from the power supply voltage terminal 161a to the precharge node 162a. When the first clock signal f becomes low and the second clock signal /f becomes high, a gate voltage of the transfer transistors Mta in a first pump stage PSa1 and the other odd-numbered pump stages PSa3, PSa5, etc. are lowered below a voltage level equal to a source voltage Vs minus a threshold voltage Vth of the transistor Mta. Thus charges flowing into the precharge node 162a are transferred to the node Nta through the transfer transistor Mta.

After this, when the first clock signal f goes high and the second clock signal /f goes low, a gate voltage of the transfer transistors Mta in the second pump stage PSa2 and the other even-numbered pump stages PSa4, PSa6, etc. are lowered below a voltage level equal to a source voltage Vs minus a threshold voltage Vth of the transistor Mta. Charges on the node Nta of the first pump stage PSa1 are thereby transferred to the node Nta of the second pump stage PSa2 through the transfer transistor Mta of the second pump stage PSa2. At this time, the gate voltage of the transfer transistor Mta in the first pump stage PSa1 is increased by a coupling voltage of the capacitor Cca, preventing charges on the transfer node Nta of the first pump stage PSa1 from flowing backward into the precharge node 162a.

The pumping operation in the other pump stages PSa2–PSai are carried out successively in the same manner as the above-described pumping operation. The charges are thereby transferred from the power supply terminal 161a to the output terminal 163a. Voltages on the transfer node Nta of each pump stage PSa1–PSai and on the output terminal 163a are gradually increased. As the voltage of the transfer node Nta in each pump stage PSa1–PSai is increased, a gate voltage of the transfer transistor Mta of each pump stage PSa1–PSai is also increased, the same as described previously. The above-described operation is performed until voltages of the transfer nodes Nta and the output terminal 163a are stabilized. That is, the pumping operation will be carried out until a desired output voltage Vpump is obtained.

When the pumping operation continues to be carried out after the transfer node Nta and the output node 163a have reached a stable voltage (e.g., when the pumping operation is carried out over several hundred ms), the gate voltage of the transfer transistor Mta in each pump stage PSa is gradually increased due to charges transferred from the transfer node Nta through a diode-connected first control PMOS transistor Mca. A voltage difference between the gate and source terminals of the transfer transistor Mta in each pump stage PSa is therefore reduced with the lapse of time.

The increase in the gate voltage of the transfer transistors Mta in the pump stages PSa1–PSai can be suppressed using the second current path. As explained previously, the second current path includes the diode-connected second and third control transistors Mcb and Mcc and the capacitor Cp. The operation of the second current path will be described below.

First, when the first clock signal f goes high and the second clock signal /f goes low, excessive charges flowing into the gate terminal of the charge transfer transistor Mta in each pump stage PSa are transferred from the gate terminal of the transfer transistor Mta to the source terminal of the third diode-connected control transistor Mcc through the second diode-connected control transistor Mcb. Second, when the first clock signal f goes low and the second clock signal /f goes high, the excessive charges thus transferred are discharged into the transfer node Nta. As this operation is repeated, the gate terminal of the transfer transistor Mta in each pump stage PSa maintains an appropriate or stable voltage. In other words, although the pumping operation of the charge pump circuit according to the present invention continues to be performed over a long period of time, the gate terminal thereof maintains a stable voltage, so that a stable or desired output voltage Vpump can also be maintained.

Figure 8:
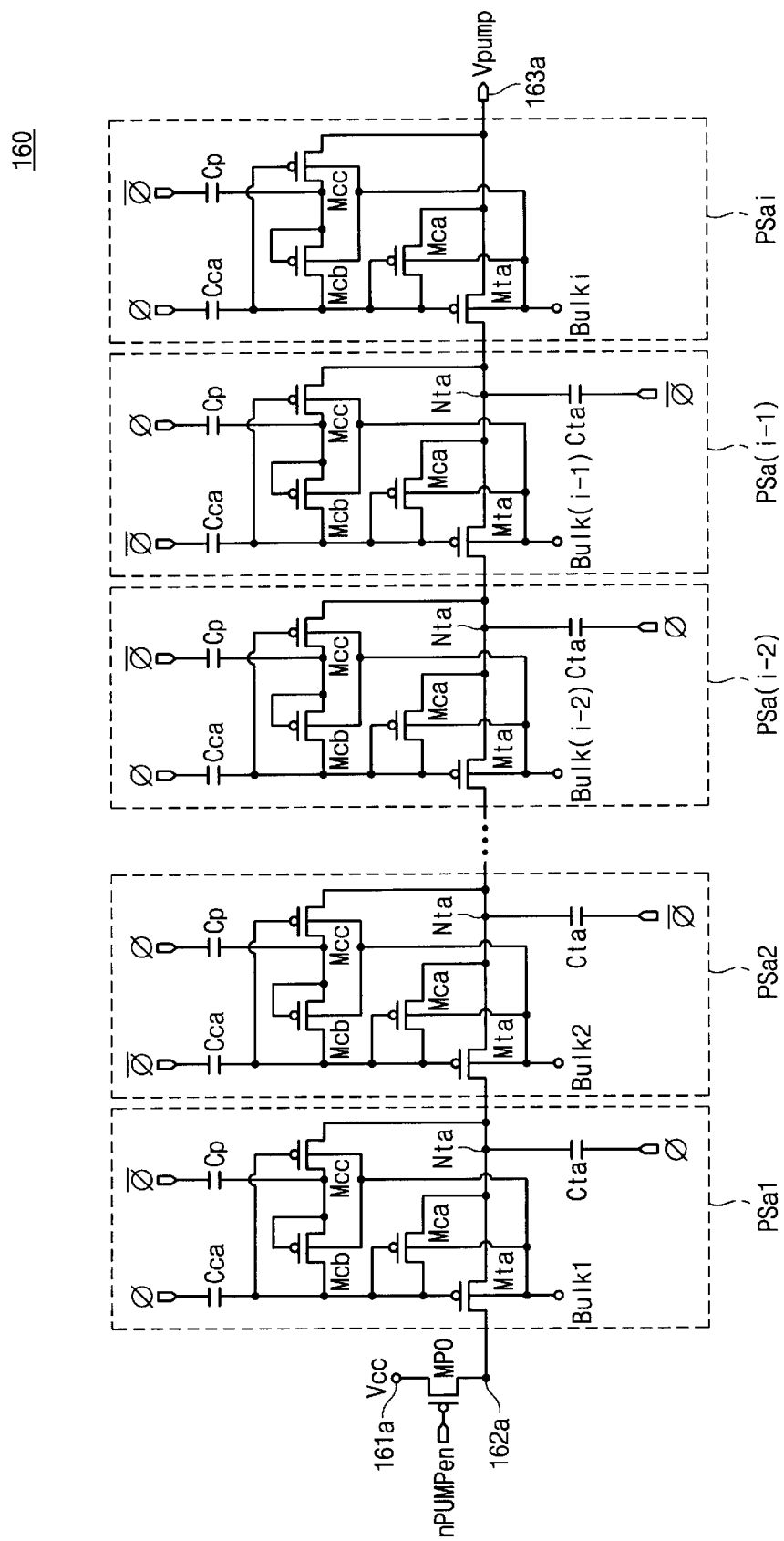

FIG. 8 is a circuit diagram of the charge pump circuit according to yet another embodiment of the present invention. Unlike the charge pump circuit of FIG. 7, the gate terminal of the third control transistor Mcc in FIG. 8 is coupled to the gate terminal of the charge transfer transistor Mta, rather than the charge transfer node Nta. The bulk terminals of the control transistors Mca, Mcb and Mcc in one pump stage are electrically separated from those in another pump stage, and the bulk terminals are floated. A voltage difference between the gate and source terminals of the transfer transistor Mta in each pump stage PSa is reduced.

Figure 9:
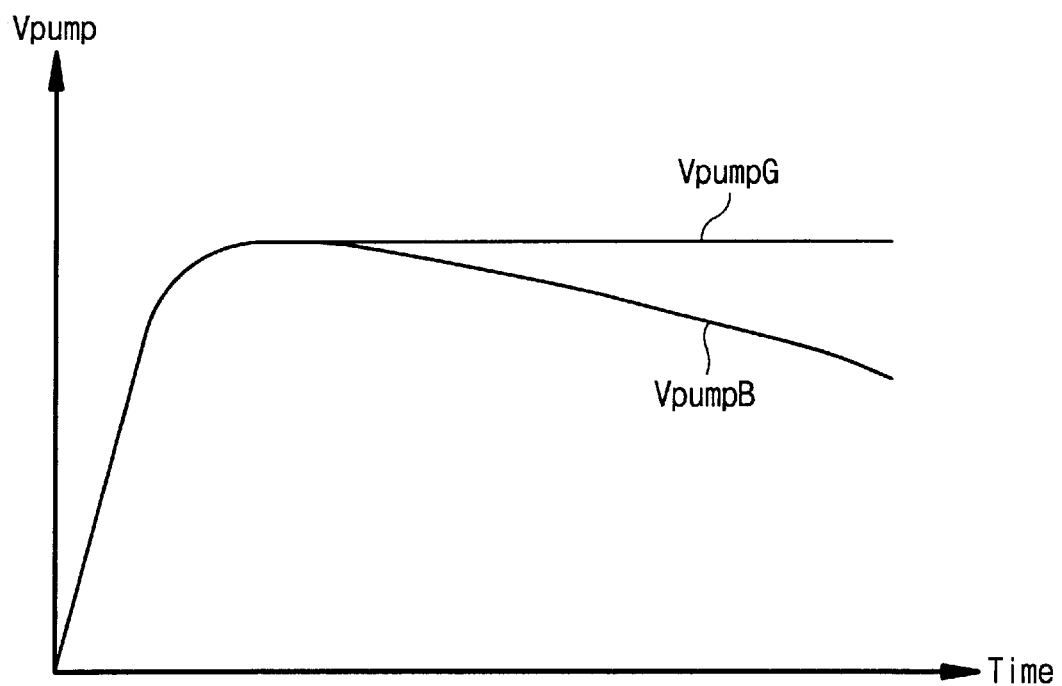
FIG. 9 is a graph illustrating variations in an output voltage of a charge pump circuit over time, according to another aspect of the present invention.

FIG. 9 is a graph showing variations in output voltage Vpump over time. A first output voltage VpumpG is obtained through use of any of the embodiments of the present invention described above, or other similar embodiments. A second output voltage VpumpB, however, represents an output voltage that is obtained when the second current path in each pump stage PSa is not utilized.

As illustrated by FIG. 9, when a pumping operation is carried out over a short period of time, the second output voltage VpumpB is maintained constant even when a second current path does not exist. When the pumping operation is carried out over a long period of time, however, the output voltage VpumpB of a charge pump circuit having no second current path is gradually lowered. On the other hand, the first output voltage VpumpG, output from a charge pump circuit having the second current path, is maintained constant even if after a predetermined time period has elapsed.

Figure 10A:
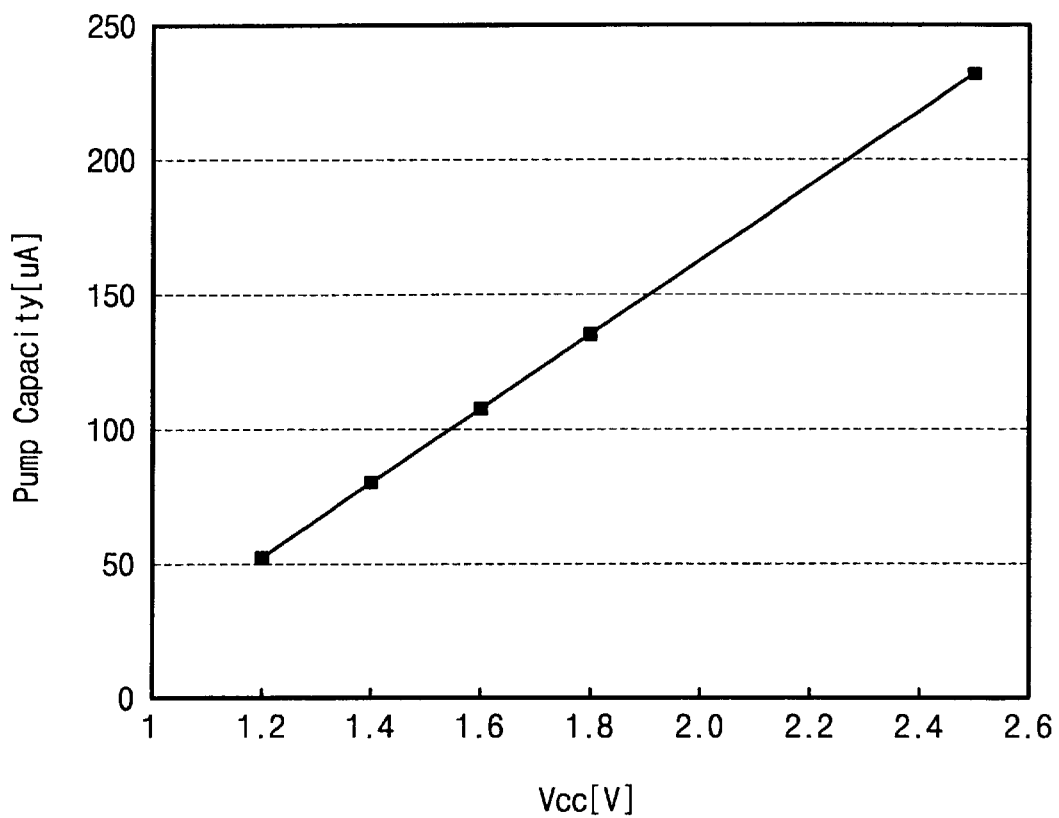
FIGS. 10A and 10B are graphs illustrating the performance and capacity of a charge pump circuit according to yet another aspect of the present invention.
Figure 10B:
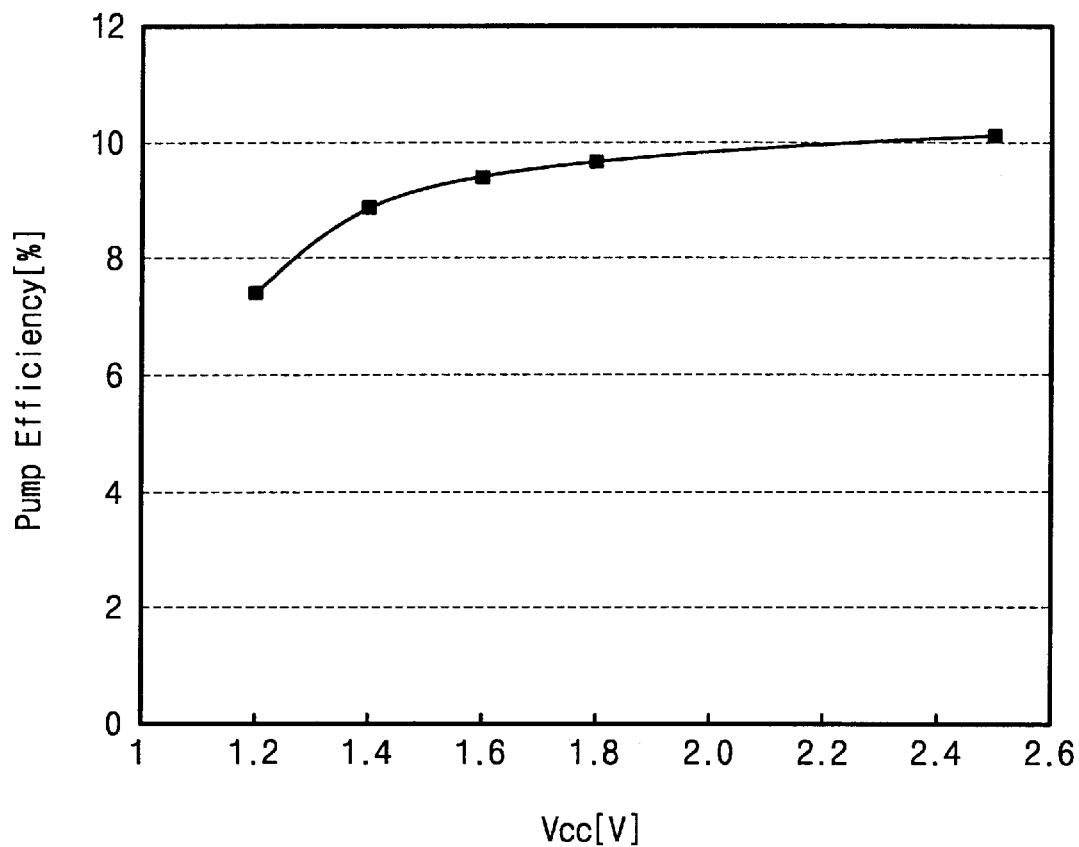

FIGS. 10A and 10B are graphs illustrating pump capacity and performance ratios of a charge pump circuit according to the present invention. As shown in FIGS. 10A and 10B, a constantly maintained output voltage allows a charge pump circuit to operate at a very low voltage (e.g., 2V or lower) and to have high pump performance. As a result, a charge pump circuit according to the present invention can generate a stable high voltage using a very low power supply voltage (e.g., 2V or lower) and can maintain a high target voltage over a long period of time (e.g., several hundred ms) without a sharp decrease in capacity.

Although the present invention has been described with respect to various exemplary embodiments thereof, various changes in the details and arrangement of those embodiments will be apparent to those skilled in the art. The scope of the invention is therefore not limited to the disclosed embodiments.

What is claimed is:
1. A charge pump circuit comprising:
an input terminal configured to receive an input voltage;
an output terminal configured to output an output voltage; and a plurality of pump stages connected in series between the input and output terminals, wherein each of the pump stages comprises:
  a charge transfer transistor having a gate terminal, a first terminal, a second terminal, and a bulk terminal maintained in a floating state;
  a first capacitor connected between the gate terminal of the charge transfer transistor and a corresponding clock signal;
  a second capacitor connected between the second terminal of the charge transfer transistor and the corresponding clock signal; and
  a current path between the gate and second terminals of the charge transfer transistor configured to permit a current to flow from the second terminal of the charge transfer transistor to the gate terminal thereof.

2. A charge pump circuit according to claim 1, further comprising a precharge transistor connected between a power supply terminal and the input terminal and configured to be turned on and off by a control signal.

3. A charge pump circuit according to claim 1, wherein odd-numbered ones of the pump stages are operated in response to one of a first and second clock signals, and wherein even-numbered ones of the pump stages are operated in response to the other one of the first and second clock signals.

4. A charge pump circuit according to claim 1, wherein the current path comprises a control transistor, said control transistor comprising:
  a gate and a first terminal connected in common to the gate terminal of the charge transfer transistor;
  a second terminal connected to the second terminal of the charge transfer transistor;
  and a bulk terminal configured to be floated.

5. A charge pump circuit comprising:
  an input terminal configured to receive an input voltage;
  an output terminal configured to output an output voltage; and
  a plurality of pump stages connected in series between the input and output terminals, wherein each of the pump stages comprises:
    a charge transfer transistor having a gate terminal, a first terminal, a second terminal, and a bulk terminal configured to be floated;
    a first capacitor connected between the gate terminal of the charge transfer transistor and a corresponding clock signal;
    a second capacitor connected between the second terminal of the charge transfer transistor and the corresponding clock signal;
    a first current path between the gate and second terminals of the charge transfer transistor configured to permit a current to flow from the second terminal of the charge transfer transistor to the gate terminal thereof; and
    a second current path between the gate and second terminals of the charge transfer transistor configured to permit a current to flow from the gate terminal of the charge transfer transistor to the second terminal thereof.

6. A charge pump circuit according to claim 5, further comprising a precharge transistor connected between a power supply terminal and the input terminal and configured to be turned on and off according to a control signal.

7. A charge pump circuit according to claim 5, wherein odd-numbered ones of the pump stages are configured to be operated in response to one of a first clock signal and a second clock signal, and wherein even-numbered ones of the pump stages are operated in response to another one of the first and second clock signals.

8. A charge pump circuit according to claim 5, wherein the first current path comprises a first control transistor, said first control transistor comprising:
  a gate and a first terminal connected in common to the gate terminal of the charge transfer transistor;
  a second terminal connected to the second terminal of the charge transfer transistor; and
  a bulk terminal configured to be floated.

9. A charge pump circuit according to claim 8, wherein the second current path comprises a second control transistor, said second control transistor comprising:
  a gate and a first terminal connected in common to the second terminal of the charge transfer transistor;
  a second terminal connected to the gate terminal of the charge transfer transistor; and
  a bulk terminal configured to be floated.

10. A charge pump circuit according to claim 8, wherein the second current path comprises second and third control transistors, and a third capacitor, and wherein:
  the third capacitor is connected between one of a first and second clock signals and a connection node, said connection node located between the second and third control transistors;
  the second control transistor comprising a gate and a first terminal connected in common to the connection node, a second terminal connected to the gate terminal of the charge transfer transistor, and a bulk terminal configured to be floated; and
  the third control transistor comprising a gate and a first terminal connected in common to the second terminal of the charge transfer transistor, a second terminal connected to the connection node, and a bulk terminal configured to be floated.

11. A charge pump circuit according to claim 8, wherein the second current path comprises a third capacitor and second and third control transistors, and wherein:
  the third capacitor is connected between one of a first and second clock signals and a connection node, said connection node located between the second and third control transistors;
  the second control transistor comprises a gate and a first terminal connected in common to the connection node, a second terminal connected to the gate terminal of the charge transfer transistor, and a bulk terminal configured to be floated; and
  the third control transistor comprises a gate terminal connected to the gate terminal of the charge transfer transistor, a first terminal connected to the connection node, a second terminal connected to the second terminal of the charge transfer transistor, and a bulk terminal configured to be floated.

12. A charge pump circuit comprising:
  an input terminal configured to receive an input voltage;
  an output terminal configured to output an output voltage;
  a precharge transistor connected between a power supply voltage terminal and the input terminal and configured to be turned on and off based on a control signal; and
  a plurality of pump stages connected in series between the input and output terminals, wherein odd-numbered ones of the pump stages are configured to be operated in response to one of first and second clock signals, said first and second clock signals having complementary states, and wherein even-numbered ones of the pump stages are configured to be operated in response to another one of the clock signals, wherein each of the pump stages comprises:
a charge transfer transistor comprising a gate terminal, a first terminal, a second terminal, and a bulk terminal configured to be floated;
a first capacitor connected between the gate terminal of the charge transfer transistor and one of the first and second clock signals;
a second capacitor connected between the second terminal of the charge transfer transistor and one of the first and second clock signals; and
a first control transistor configured to permit a current flow from the second terminal of the charge transfer transistor to the gate terminal thereof, wherein the first control transistor comprises a gate and a first terminal connected in common to the gate terminal of the charge transfer transistor, a second terminal connected to the second terminal of the charge transfer transistor, and a bulk terminal configured to be floated.

13. A charge pump circuit according to claim 12, wherein each of said pump stages further comprises a second control transistor configured to provide a current flow from the gate terminal of the charge transfer transistor to the second terminal thereof, wherein the second control transistor comprises a gate and a first terminal connected in common to the second terminal of the charge transfer transistor, a second terminal connected to the gate terminal of the charge transfer transistor, and a bulk terminal configured to be floated.

14. A charge pump circuit comprising:
an input terminal configured to receive an input voltage;
an output terminal configured to output an output voltage;
a first PMOS transistor connected between a power supply voltage terminal and the input terminal and configured to be turned on and off based on a control signal; and
a plurality of pump stages connected in series between the input and output terminals, wherein odd-numbered ones of the pump stages are configured to be operated in response to either a first or second clock signal, said first and second clock signals having complementary states, and wherein even-numbered ones of the pump stages are configured to be operated in response to a different one of the first and second clock signals than the odd-numbered ones of the pump stages, and wherein each of the pump stages comprises:
a charge transfer transistor comprising a gate terminal, a first terminal, a second terminal, and a bulk terminal configured to be floated;
a first capacitor connected between the gate terminal of the charge transfer transistor and one of the first and second clock signals;
a second capacitor connected between the second terminal of the charge transfer transistor and the same one of the first and second clock signals as the first capacitor; and
a second PMOS transistor configured to provide a current flow from the second terminal of the charge transfer transistor to the gate terminal thereof, wherein the second PMOS transistor comprises a gate and a first terminal connected in common to the gate terminal of the charge transfer transistor, a second terminal connected to the second terminal of the charge transfer transistor, and a bulk terminal configured to be floated.

15. A charge pump circuit according to claim 14, wherein each of said pump stages further comprises a third PMOS transistor configured to provide a current flow from the gate terminal of the charge transfer transistor to the second terminal thereof, wherein the third PMOS transistor comprises a gate and a first terminal connected in common to the second terminal of the charge transfer transistor, a second terminal connected to the gate terminal of the charge transfer transistor, and a bulk terminal configured to be floated.

16. A charge pump circuit comprising:
an input terminal configured to receive an input voltage;
an output terminal configured to output an output voltage;
a precharge transistor connected between a power supply voltage terminal and the input terminal and configured to be turned on and off based on a control signal; and
a plurality of pump stages connected in series between the input and output terminals, wherein each of the pump stages comprises:
a charge transfer transistor comprising a gate terminal, a first terminal, a second terminal, and a bulk terminal configured to be floated;
a first capacitor connected between the gate terminal of the charge transfer transistor and a first or second clock signal, said first and second clock signals having complementary states;
a second capacitor connected between the second terminal of the charge transfer transistor and the same clock signal as the first capacitor;
a first control transistor configured to allow a current flow from the second terminal of the charge transfer transistor to the gate terminal thereof, wherein the first control transistor comprises a gate and a first terminal connected in common to the gate terminal of the charge transfer transistor, a second terminal connected to the second terminal of the charge transfer transistor, and a bulk terminal configured to be floated; and
a third capacitor, a second control transistor, and a third control transistor connected between the gate terminal of the charge transfer transistor and configured to permit a current flow from the gate terminal of the charge transfer transistor to the second terminal thereof, based on the first and second clock signals.

17. A charge pump circuit according to claim 16, wherein the third capacitor is connected between a different one of the first and second clock signals than the first and second capacitors and a connection node, said connection node located between the first and second control transistors, wherein the second control transistor comprises a gate and a first terminal connected in common to the connection node, a second terminal connected to the gate terminal of the charge transfer transistor, and a bulk terminal configured to be floated, and wherein the third control transistor comprises a gate and a first terminal connected in common to the second terminal of the charge transfer transistor, a second terminal connected to the connection node, and a bulk terminal configured to be floated.

18. A charge pump circuit comprising:
an input terminal configured to receive an input voltage;
an output terminal configured to output an output voltage;
a first PMOS transistor connected between a power supply voltage terminal and the input terminal and configured to be turned on and off based on a control signal; and a plurality of pump stages connected in series between the input and output terminals, wherein each of the pump stages comprises:
  a charge transfer transistor comprising a gate terminal, a first terminal, a second terminal, and a bulk terminal configured to be floated;
  a first capacitor connected between the gate terminal of the charge transfer transistor and a first selected one of a first and second clock signals, said first and second clock signals having complementary states;
  a second capacitor connected between the second terminal of the charge transfer transistor and the first selected clock signal;
  a second PMOS transistor configured to enable a current flow from the second terminal of the charge transfer transistor to the gate terminal thereof, wherein the second PMOS transistor has a gate and a first terminal connected in common to the gate terminal of the charge transfer transistor, a second terminal connected to the second terminal of the charge transfer transistor, and a bulk terminal configured to be floated; and
  a third capacitor, a third PMOS transistor, and a fourth PMOS transistor connected between the gate terminal of the charge transfer transistor to enable a current flow from the gate terminal of the charge transfer transistor to the second terminal thereof, based on the first and second clock signals, wherein:
    the third capacitor is connected between a second selected one of the first and second clock signals and a connection node, said connection node located between the second and third PMOS transistors;
    the second PMOS transistor comprising a gate and a first terminal connected in common to the connection node, a second terminal connected to the gate terminal of the charge transfer transistor, and a bulk terminal configured to be floated; and
    the third PMOS transistor comprising a gate terminal connected to the gate terminal of the charge transfer transistor, a first terminal connected to the connection node, a second terminal connected to the second terminal of the charge transfer transistor, and a bulk terminal configured to be floated.

19. A method for generating a high voltage from a low power supply voltage using a charge pump circuit, said method comprising:
  maintaining a bulk terminal from each of a plurality of first charge transfer transistors in a floating state;
  producing a predetermined voltage from a first terminal of each of the plurality of first charge transfer transistors;
  transferring the predetermined voltage from the first terminal of each of the first charge transfer transistors to a second terminal thereof only in response to a first clock signal;
  turning off a plurality of second charge transfer transistors only in response to a second clock signal, said second clock signal being complementary to the first clock signal;
  permitting current flow from the second terminal of each of the first charge transfer transistors to a gate terminal thereof; and
  permitting current flow from a gate terminal of each of the second charge transfer transistors into the second terminal thereof.

20. A method according to claim 19, wherein the first and second charge transfer transistors are alternately arranged in sequence.

21. A charge pump circuit comprising:
an input terminal configured to receive an input voltage;
an output terminal configured to output an output voltage; and
a plurality of pump stages connected in series between the input and output terminals, wherein each of the pump stages comprises:
  a charge transfer transistor having a gate terminal, a first terminal, a second terminal, and a bulk terminal configured to be floated;
  a first capacitor connected between the gate terminal of the charge transfer transistor and a corresponding clock signal;
  a second capacitor connected between the second terminal of the charge transfer transistor and a corresponding clock signal;
  a first current path between the gate and second terminals of the charge transfer transistor configured to permit a current to flow from the second terminal of the charge transfer transistor to the gate terminal thereof, wherein the first current path comprises a first control transistor, said first control transistor comprising a gate and a first terminal connected in common to the gate terminal of the charge transfer transistor; and
  a second current path between the gate and second terminals of the charge transfer transistor configured to permit a current to flow from the gate terminal of the charge transfer transistor to the second terminal thereof, wherein the second current path comprises a second and a third control transistors and a third capacitor, wherein the third capacitor is connected between one of a first and second clock signals and a connection node, said connection node located between the second and third control transistors, the second control transistor comprising a gate and a first terminal connected in common to the connection node, a second terminal connected to the gate terminal of the charge transfer transistor, and a bulk terminal configured to be floated, the third control transistor comprising a gate and a first terminal connected in common to the second terminal of the charge transfer transistor, a second terminal connected to the connection node, and a bulk terminal configured to be floated.

22. A charge pump circuit comprising:
an input terminal configured to receive an input voltage;
an output terminal configured to output an output voltage; and
a plurality of pump stages connected in series between the input and output terminals, wherein each of the pump stages comprises:
  a charge transfer transistor having a gate terminal, a first terminal, a second terminal, and a bulk terminal configured to be floated;
  a first capacitor connected between the gate terminal of the charge transfer transistor and a corresponding clock signal;
  a second capacitor connected between the second terminal of the charge transfer transistor and a corresponding clock signal;
  a first current path between the gate and second terminals of the charge transfer transistor configured to permit a current to flow from the second terminal of the charge transfer transistor to the gate terminal thereof, wherein the first current path comprises a first control transistor, said first control transistor comprising a gate and a first terminal connected in common to the gate terminal of the charge transfer transistor; and a second current path between the gate and second terminals of the charge transfer transistor configured to permit a current to flow from the gate terminal of the charge transfer transistor to the second terminal thereof, wherein the second current path comprises a third capacitor and second and third control transistors, wherein the third capacitor is connected between one of a first and second clock signals and a connection node, said connection node located between the second and third control transistors, the second control transistor comprising a gate and a first terminal connected in common the connection node, a second terminal connected to the gate terminal of the charge transfer transistor, and a bulk terminal configured to floated, the third control transistor comprising a gate terminal connected to the gate terminal of the charge transfer transistor, a first terminal connected to the connection node, a second terminal connected to the second terminal of the charge transfer transistor, and a bulk terminal configured to be floated.

23. A charge pump circuit comprising:

an input terminal configured to receive an input voltage;

an output terminal configured to output an output voltage; and a plurality of pump stages connected in series between the input and output terminals, wherein each of the pump stages comprises:
- a charge transfer transistor having a gate terminal, a first terminal, a second terminal, and a bulk terminal;
- a first capacitor connected between the gate terminal of the charge transfer transistor and a corresponding clock signal;
- a second capacitor connected between the second terminal of the charge transfer transistor and the corresponding clock signal; and
- a current path between the gate and second terminals of the charge transfer transistor configured to permit a current to flow from the second terminal of the charge transfer transistor to the gate terminal thereof, wherein the current path comprises a control transistor having a gate and a first terminal connected in common to the gate terminal of the charge transfer transistor, a second terminal connected to the second terminal of the charge transfer transistor, and a bulk terminal configured to be floated.

* * * * *